US012182181B2

(12) United States Patent
Wen

(10) Patent No.: US 12,182,181 B2
(45) Date of Patent: Dec. 31, 2024

(54) DATA PROCESSING METHOD AND APPARATUS THEREOF, ELECTRONIC DEVICE, AND COMPUTER-READABLE STORAGE MEDIUM

(71) Applicant: BOE TECHNOLOGY GROUP CO., LTD., Beijing (CN)

(72) Inventor: Jinxiao Wen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 48 days.

(21) Appl. No.: 17/908,271

(22) PCT Filed: Aug. 20, 2021

(86) PCT No.: PCT/CN2021/113809
§ 371 (c)(1),
(2) Date: Aug. 31, 2022

(87) PCT Pub. No.: WO2023/019560
PCT Pub. Date: Feb. 23, 2023

(65) Prior Publication Data
US 2023/0334068 A1  Oct. 19, 2023

(51) Int. Cl.
*G06F 16/28* (2019.01)
*G06F 16/16* (2019.01)
*G06F 16/2458* (2019.01)

(52) U.S. Cl.
CPC ............ *G06F 16/288* (2019.01); *G06F 16/16* (2019.01)

(58) Field of Classification Search
CPC ........ G06F 16/288; G06F 16/16; G06F 16/00; G06F 16/2458
See application file for complete search history.

(56) References Cited

U.S. PATENT DOCUMENTS

| 7,546,312 B1 | 6/2009 | Xu et al. |
| 2008/0046165 A1* | 2/2008 | Downs ................ G08G 1/0104 |
| | | 701/117 |

(Continued)

FOREIGN PATENT DOCUMENTS

| CN | 101963970 A | 2/2011 |
| CN | 105354272 A | 2/2016 |

(Continued)

OTHER PUBLICATIONS

WANG Ke, et al, "Organization Method of Traffic Time and Space Data based on Multi Granularity", Geometrics & Spacial Information Technology, vol. 38, No. 12, pp. 55-56 & continued p. 60, China, Dec. 2015.

(Continued)

*Primary Examiner* — Robert W Beausoliel, Jr.
*Assistant Examiner* — Mohammad S Bhuyan
(74) *Attorney, Agent, or Firm* — Chiwin Law LLC

(57) ABSTRACT

A data processing method, a data processing apparatus, an electronic device, and a computer-readable storage medium are provided. The data processing method includes: acquiring at least one piece of sample data in a statistical group, each piece of sample data including a statistical indicator and an indicator value of the statistical indicator; creating a first statistical array corresponding to the statistical indicator, the first statistical array including a plurality of first elements, and the plurality of first elements being used to perform statistics on different indicator values, respectively; and traversing indicator values of the at least one piece of sample data, and performing statistics on the at least one piece of sample data by using the first statistical array, so as to obtain a data statistical result, the plurality of first elements of the first statistical array being statistical sub-results of respective indicator values, respectively.

15 Claims, 7 Drawing Sheets

(56) References Cited

U.S. PATENT DOCUMENTS

| | | | |
|---|---|---|---|
| 2008/0071465 A1* | 3/2008 | Chapman | G01C 21/3691 |
| | | | 701/117 |
| 2009/0043730 A1* | 2/2009 | Lavdas | G06F 16/283 |
| 2019/0156917 A1 | 5/2019 | Liu et al. | |
| 2020/0311588 A1* | 10/2020 | Watanabe | G06F 16/9024 |
| 2021/0232474 A1* | 7/2021 | Zotto | G06F 11/3075 |
| 2023/0360548 A1* | 11/2023 | Kawakami | G06Q 50/20 |

FOREIGN PATENT DOCUMENTS

| | | | | |
|---|---|---|---|---|
| CN | 106991145 A | | 7/2017 | |
| CN | 107229730 A | | 10/2017 | |
| CN | 110943883 A | * | 3/2020 | H04L 12/66 |
| CN | 112001829 A | | 11/2020 | |

OTHER PUBLICATIONS

Yoshihiro Tsuji et al, "Data Structure Enabling Retrieval of Time Series of Traffic with the Requested Granularity", proceedings of the 2014 IEEE ICCS.

* cited by examiner

DATA PROCESSING METHOD AND APPARATUS THEREOF, ELECTRONIC DEVICE, AND COMPUTER-READABLE STORAGE MEDIUM This application is a U.S. National Phase Entry of International Application No. PCT/CN2021/113809, filed on Aug. 20, 2021, designating the United States of America. The present application claims priority to and the benefit of the above-identified application and the above-identified application is incorporated by reference herein in its entirety.

TECHNICAL FIELD

Embodiments of the present disclosure relate to a data processing method and an apparatus thereof, an electronic device, and a computer-readable storage medium.

BACKGROUND

With the rapid development of science, technology, and economy, the current society has entered the era of big data. Performing statistics and analysis on big data can excavate valuable information from big data, and then the valuable information can be used to achieve improvement and optimization in various fields of society. For example, the disadvantages of urban traffic can be found through statistics and analysis of traffic data, so that urban traffic can be improved according to the founded disadvantages.

SUMMARY

At least one embodiment of the present disclosure provides a data processing method, which comprises: acquiring at least one piece of sample data in a statistical group, where each piece of sample data comprises a statistical indicator and an indicator value of the statistical indicator; creating a first statistical array corresponding to the statistical indicator, where the first statistical array comprises a plurality of first elements, and the plurality of first elements are used to perform statistics on different indicator values, respectively; and traversing indicator values of the at least one piece of sample data, and performing statistics on the at least one piece of sample data by using the first statistical array, so as to obtain a data statistical result, where the plurality of first elements of the first statistical array are statistical sub-results of respective indicator values, respectively.

For example, in the data processing method provided by an embodiment of the present disclosure, acquiring the at least one piece of sample data in the statistical group comprises: acquiring a plurality of pieces of sample data corresponding to each statistical group of a plurality of statistical groups; traversing the indicator values of the at least one piece of sample data, and performing statistics on the at least one piece of sample data by using the first statistical array, so as to obtain the data statistical result, comprises: for each statistical group, traversing the indicator values of the at least one piece of sample data, and performing statistics on the at least one piece of sample data by using the first statistical array, so as to obtain the data statistical result.

For example, in the data processing method provided by an embodiment of the present disclosure, at least one piece of sample data acquired in a statistical unit serves as one statistical group, and the method further comprises: determining at least one to-be-counted indicator value from the different indicator values; acquiring a plurality of statistical intervals, where each statistical interval comprises at least one statistical unit; establishing a second statistical array for the plurality of statistical intervals, where the second statistical array comprises a plurality of second elements, and the plurality of second elements are in one-to-one correspondence with the plurality of statistical intervals; screening interval statistical results belonging to the plurality of statistical intervals from the data statistical result in each statistical group; and respectively performing statistics on the to-be-counted indicator value in the interval statistical results by using the plurality of second elements, so as to obtain an indicator value statistical result of the to-be-counted indicator value of each statistical interval.

For example, in the data processing method provided by an embodiment of the present disclosure, respectively performing statistics on the to-be-counted indicator value in the interval statistical results by using the plurality of second elements, so as to obtain the indicator value statistical result of the to-be-counted indicator value of each statistical interval, comprises: for each interval statistical result, determining a statistical interval to which a statistical group corresponding to the interval statistical result belongs; extracting a statistical sub-result of the to-be-counted indicator value from the interval statistical result; and accumulating the statistical sub-result to a second element corresponding to the statistical interval to which the statistical group corresponding to the interval statistical result belongs, so as to obtain the indicator value statistical result of the to-be-counted indicator value of each statistical interval.

For example, in the data processing method provided by an embodiment of the present disclosure, traversing the indicator values of the at least one piece of sample data in the statistical group, and performing statistics on the at least one piece of sample data in the statistical group by using the first statistical array, so as to obtain the data statistical result in the statistical group, comprises: traversing the indicator values of the at least one piece of sample data in the statistical group, and respectively counting respective indicator values in the statistical group by using a plurality of elements in the first statistical array, so as to obtain the data statistical result in the statistical group.

For example, in the data processing method provided by an embodiment of the present disclosure, the plurality of statistical intervals comprise a first statistical interval and a second statistical interval; and a range of the second statistical interval is larger than a range of the first statistical interval, and the first statistical interval is within the second statistical interval.

For example, the data processing method provided by an embodiment of the present disclosure further comprises: receiving initial data from a data source; and establishing the at least one piece of sample data according to the initial data.

For example, in the data processing method provided by an embodiment of the present disclosure, the initial data comprises statistical attribute information, and establishing the at least one piece of sample data according to the initial data comprises: determining whether there is a storage file for storing the initial data according to the statistical attribute information; in response to the case where there is the storage file for storing the initial data, storing the initial data in the storage file for serving as the at least one piece of sample data; and in response to the case where there is no storage file for storing the initial data, determining a statistical group to which the initial data belongs according to the statistical attribute information, generating a file path according to the statistical group, and creating the storage file in the file path, where the storage file is used to store the initial data, so that the initial data serves as the at least one piece of sample data, and initial data belonging to a same statistical group is stored in a same storage file.

For example, in the data processing method provided by an embodiment of the present disclosure, acquiring the at least one piece of sample data in the statistical group comprises: generating a file path of a storage file corresponding to the statistical group; determining whether there is the file path; and in response to the case where there is the file path, acquiring initial data in the statistical group from the storage file in the file path for serving as the at least one piece of sample data.

For example, in the data processing method provided by an embodiment of the present disclosure, the statistical unit comprises a preset time period or at least one terminal device of a preset amount.

For example, in the data processing method provided by an embodiment of the present disclosure, the data processing method is applied to a plurality of electronic devices, the at least one piece of sample data comprises a plurality of sample data sets, and the plurality of electronic devices are in one-to-one correspondence with the plurality of sample data sets; and the plurality of electronic devices are configured to perform statistics based on a corresponding sample data set, respectively, and perform summation on statistical values to obtain the data statistical result.

At least one embodiment of the present disclosure further provides a data processing apparatus, which comprises: a sample acquisition unit, configured to acquire at least one piece of sample data in a statistical group, where each piece of sample data comprises a statistical indicator and an indicator value of the statistical indicator; an array creation unit, configured to create a first statistical array corresponding to the statistical indicator, where the first statistical array comprises a plurality of first elements, and the plurality of first elements are used to perform statistics on different indicator values, respectively; and a traversing unit, configured to traverse indicator values of the at least one piece of sample data, and perform statistics on the at least one piece of sample data by using the first statistical array, so as to obtain a data statistical result, where the plurality of first elements of the first statistical array are statistical sub-results of respective indicator values, respectively.

At least one embodiment of the present disclosure further provides an electronic device, which comprises: a processor; and a memory, comprising one or more computer program instructions. The one or more computer program instructions are stored in the memory and are capable of being executed by the processor to implement the data processing method provided by any one of the embodiments of the present disclosure.

At least one embodiment of the present disclosure further provides a computer-readable storage medium, which non-transitorily stores computer-readable instructions. The computer-readable instructions are capable of being executed by a processor to implement the data processing method provided by any one of the embodiments of the present disclosure.

BRIEF DESCRIPTION OF THE DRAWINGS

In order to clearly illustrate the technical solution of the embodiments of the present disclosure, the drawings of the embodiments will be briefly described. It is obvious that the described drawings in the following are only related to some embodiments of the present disclosure and thus are not limitative of the present disclosure.

DETAILED DESCRIPTION

Figure 1A:
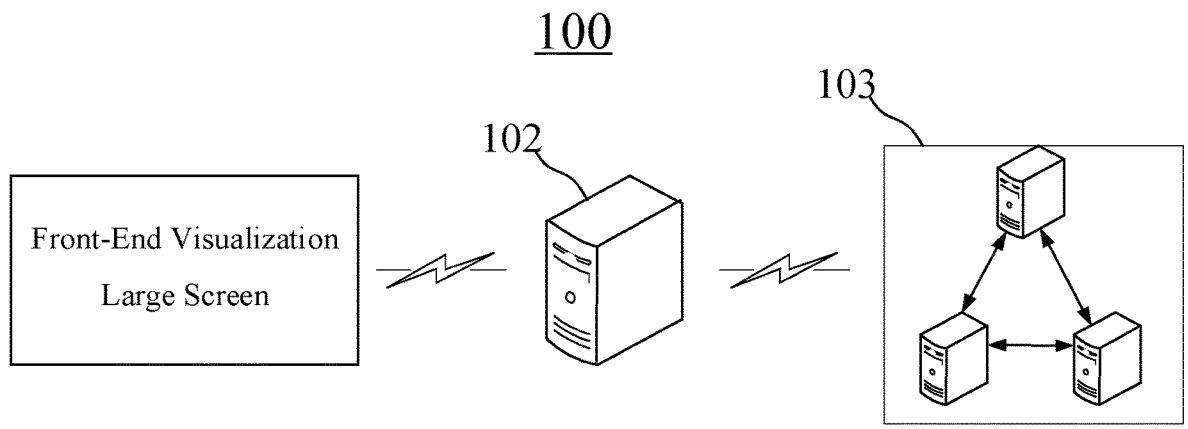
FIG. 1A illustrates a system architecture to which a data processing method provided by at least one embodiment of the present disclosure can be applied.

In order to make objects, technical details and advantages of the embodiments of the present disclosure apparent, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. Also, the terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

In big data statistics, it is often necessary to perform statistic on a plurality of items in sample data. In the related art, it is usually necessary to traverse the sample data once for each item of the plurality of items to obtain the statistical results of respective items of the plurality of items. This statistical analysis method is time-consuming and laborious. It should be understood that the "item" here represents different meanings in different statistical situations, for example, the "item" refers to different statistical indicators or also refers to the indicator values of the same statistical indicator. For example, "item" may include a statistical indicator "total amount", a statistical indicator "device operating time", and the like. For another example, in the case where the statistical indicator is "gender", "item" refers to indicator values 1 and 2 of gender, for example, "1" represents "male", and for example, "2" represents "female".

For example, the traffic all-media management and control platform is a software-hardware integrated industrial digital platform for public traffic operators or media operators that provides customer group analysis, information management and precise delivery, centralized management and control of media equipment, and real-time environmental monitoring. The contents displayed by the front-end visualization large screen of the traffic all-media management and control platform include rich and varied themes, such as institutional users, traffic passenger flow, media advertising content, hardware device information, and the like, and there are many statistical indicators and report components in each theme. For example, the customer group analysis page of the front-end visualization large screen includes time-sharing statistics of various types of passenger flows (passing, reaching, and following), statistics of passenger flows of different genders and age groups, ranking statistics of followers of various advertisements, and the like. The media content page of the front-end visualization large screen includes the amount of play plans, the amount of normal play plans, the amount of failed play plans, popular advertisements, popular materials, and the like, and the hardware device page of the front-end visualization large screen includes information such as the running time of various servers and playback devices. For example, the above-mentioned statistical indicators need to be calculated according to organizational dimensions (e.g., lines, stations, and devices for a subway scenario) and time dimensions (e.g., the current day, 7 days, 30 days), and most pages need to be updated at a certain frequency (e.g., 1 hour).

If the traffic all-media management and control platform uses the statistical methods in the above-mentioned related technologies to perform statistical analysis on the above-mentioned statistical indicators and the indicator values of the statistical indicators, it not only requires a long statistical time but also may cause performance problems of the device used for statistical analysis due to the throughput of big data. It should be understood that, although the traffic all-media management and control platform is used as an example to illustrate the implementation of the present disclosure, this does not mean that the present disclosure is only applied to traffic application scenarios such as the traffic all-media management and control platform, and the data processing method of the present disclosure can be applied to any application scenario for statistical analysis of data.

At least one embodiment of the present disclosure provides a data processing method, a data processing apparatus, an electronic device, and a computer-readable storage medium. The data processing method includes: acquiring at least one piece of sample data in a statistical group, in which each piece of sample data includes a statistical indicator and an indicator value of the statistical indicator; creating a first statistical array corresponding to the statistical indicator, in which the first statistical array includes a plurality of first elements, and the plurality of first elements are used to perform statistics on different indicator values, respectively; and traversing indicator values of the at least one piece of sample data, and performing statistics on the at least one piece of sample data by using the first statistical array, so as to obtain a data statistical result, in which the plurality of first elements of the first statistical array are statistical sub-results of respective indicator values.

The data processing method uses an array to realize the statistics of a plurality indicator values through data processing once, and realizes the calculation of high parallelism, thereby improving the efficiency of data calculation, and only the statistical indicator needs to be updated, so that the method can be applied to the statistics of the updated statistical indicators, so the method also has high reusability. In some embodiments, the data processing method can also be executed many times, execution of the data processing method each time is regarded as one stage, and the next stage is entered based on the data statistical results obtained by executing the data processing method in the previous stage. In this way, further statistical analysis of the data statistical results can be performed, thereby reducing data redundancy, realizing data regularization, and effectively avoiding the performance problems of computing device caused by instantaneous large-throughput data.

FIG. 1A illustrates a system architecture to which a data processing method provided by at least one embodiment of the present disclosure can be applied.

As illustrated in FIG. 1A, the system architecture 100 includes a front-end visualization large screen 101, a service end 102, and a big data background 103.

The front-end visualization large screen 101 is used to present rich and varied themed content, for example, including institutional users, traffic passenger flow, media advertising content, hardware device information, and the like. For example, the customer group analysis page of the front-end visualization large screen 101 includes time-sharing statistics of various types of passenger flows (passing, reaching, and following), statistics of passenger flows of different genders and age groups, ranking statistics of followers of various advertisements, and the like. The media content page of the front-end visualization large screen 101 includes the amount of play plans, the amount of normal play plans, the mount of failed play plans, popular advertisements, popular materials, and the like, and the hardware device page of the front-end visualization large screen 101 includes information such as the running time of various servers and playback devices.

The service end 102 is, for example, a server that provides support for the front-end visualization large screen 101. For example, the server can analyze and process data such as requests received from the front-end visualization large screen 101, and feed back the processing results (e.g., web pages, information, or data acquired or generated according to the requests) to the front-end visualization large screen 101. The service end 102 is an independent physical server, a server cluster composed of a plurality of physical servers, a distributed system composed of a plurality of physical servers, a cloud server, or the like.

In the embodiments of the present disclosure, the service end 102 not only interacts with the front-end visualization large screen 101, but also interacts with the big data background 103, and the service end 102 can serve as an interface for the interaction between the front-end visualization large screen 101 and the big data background. For example, the service end 102 can transmit sample data from a terminal device or a request from the front-end visualization large screen 101 to the big data background 103, and the big data background 103 performs statistical analysis on the sample data or responds to the request. The service end 102 can send the statistical results of the big data background 103 to the front-end visualization large screen 101, so as to display the results of statistical analysis on the front-end visualization large screen 101.

The big data background 103 may be an independent physical server, a server cluster composed of a plurality of physical servers, a distributed system composed of a plurality of physical servers, a cloud server, or the like. The data processing method provided by at least one embodiment of the present disclosure can be executed by the big data background 103. The system architecture can push down batch data processing to the big data background 103 for calculation, which can effectively reduce the pressure on the calculation and response time of the front-end visualization large screen 101 and the service end 102.

It can be understood that the system architecture illustrated in FIG. 1A is only an example and has no limiting effect on the present disclosure, and those skilled in the art can implement the data processing method of the present disclosure through any system architecture. For example, the data processing method can also be executed only by the service end 102 and the front-end visualization large screen 101. The data processing method provided by at least one embodiment of the present disclosure can be mainly executed by the service end 102 (for example, performing calculation), and in this case, the system architecture does not include the big data background 103.

Figure 1B:
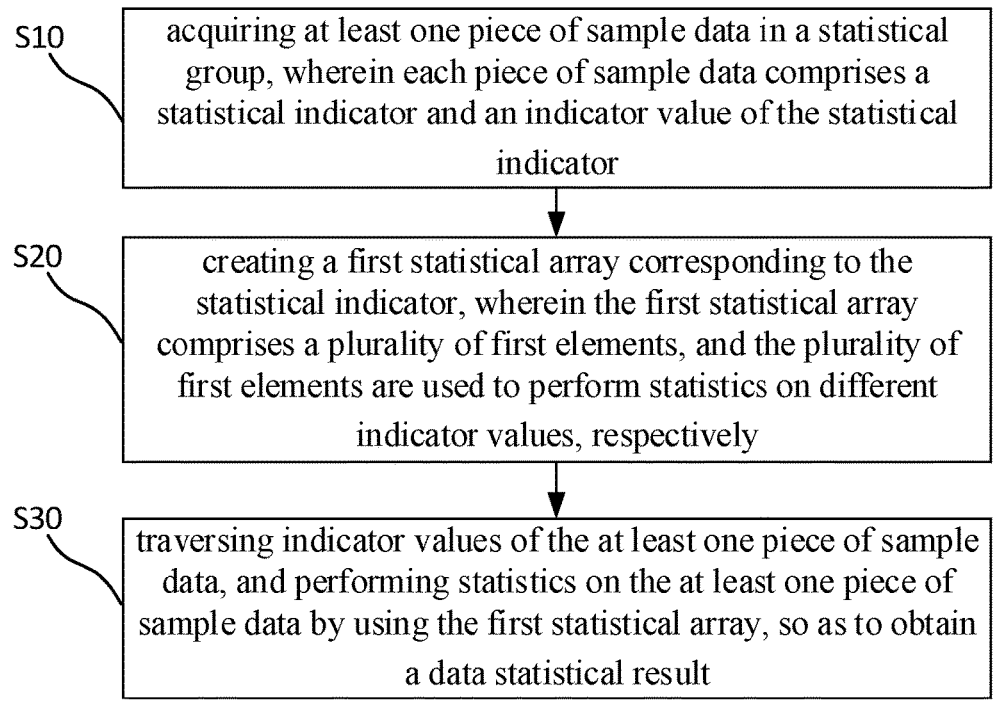
FIG. 1B illustrates a flowchart of a data processing method provided by at least one embodiment of the present disclosure.

FIG. 1B illustrates a flowchart of a data processing method provided by at least one embodiment of the present disclosure.

As illustrated in FIG. 1B, the method includes steps S10 to S30.

Step S10: acquiring at least one piece of sample data in a statistical group, in which each piece of sample data includes a statistical indicator and an indicator value of the statistical indicator.

Step S20: creating a first statistical array corresponding to the statistical indicator, in which the first statistical array includes a plurality of first elements, and the plurality of first elements are used to perform statistics on different indicator values, respectively.

Step S30: traversing indicator values of the at least one piece of sample data, and performing statistics on the at least one piece of sample data by using the first statistical array, so as to obtain a data statistical result.

For step S10, for example, at least one piece of sample data captured within a preset time period serves as one statistical group, or at least one piece of sample data captured by a preset terminal device (for example, in a subway scenario, a display screen arranged at a station) serves as one statistical group.

For example, the preset time period is 1 hour, and at least one piece of sample data captured from 15:00 on Mar. 30, 2021 to 16:00 on Mar. 30, 2021 is acquired. For example, in a subway scenario, the sample data includes a track record after analyzing images captured by a camera through a computer vision technology, and the camera is a camera in a display screen arranged at a subway station.

Table 1 below schematically shows at least one piece of sample data captured in the statistical group from 15:00 on Mar. 30, 2021 to 16:00 on Mar. 30, 2021.

As illustrated in Table 1, Table 1 contains a plurality of fields, and each field represents a sample indicator. Each piece of sample data includes a plurality of sample indicators, for example, the plurality of sample indicators are event time, camera identification code (ID), head ID, head state, age, gender, and duration, respectively. Each sample indicator has an indicator value corresponding to the sample indicator, and the indicator value refers to the value of the sample indicator. For example, the indicator values of the head state include 1, 2, and 3, respectively representing that the state of the passenger is identified as passing by the screen, reaching the screen, and following the screen. The "screen" here refers, for example, to a screen of a display screen in a subway station in a subway scenario. The indicator values of age include 1, 2, 3, and 4, representing the interval of the identified age, respectively, such as 1 for 0-18 years old, 2 for 19-30 years old, 3 for 31-50 years old, and 4 for 51 years old and above. The indicator values of gender include 1 and 2, representing male and female, respectively. The indicator value of the event time is the moment when the event occurs, that is, the moment when the head ID is captured. The indicator value of the camera ID refers to the serial number of the camera that captured the head ID. For example, in a subway scenario, the camera is a camera arranged on a display screen in a station.

For example, in Table 1, example data 1 represents that when the event time is 1599129468132, the camera with the serial number of camera04 captures a passenger who is marked with a head ID of 1 reaching the screen, the passenger's age is between 0 and 18 years old, and the passenger is female.

In some embodiments of the present disclosure, one or more of the plurality of sample indicators may serve as statistical indicators. For example, the head state may serve as a statistical indicator. For another example, the gender may serve as a statistical indicator. For another example, both the head state and the gender may serve as statistical indicators.

TABLE 1

| Field Name | Event Time | Camera ID | Head ID | Head State | Age | Gender | Duration |
|---|---|---|---|---|---|---|---|
| Example Data 1 | 1599129468132 | camera04 | 1 | 2 | 1 | 2 | 2 minutes |
| Example Data 2 | 1599129468135 | camera01 | 2 | 1 | 2 | 1 | 30 seconds |
| ... | ... | ... | ... | ... | ... | ... | ... |

TABLE 1-continued

| Field Name | Event Time | Camera ID | Head ID | Head State | Age | Gender | Duration |
|---|---|---|---|---|---|---|---|
| Example Data N | ... | ... | ... | ... | ... | ... | ... |

In some embodiments of the present disclosure, the statistical indicator may be selected from a plurality of sample indicators by a person or a statistician skilled in the art.

For step S20, for example, the first statistical array corresponding to the statistical indicator is created according to an indicator value list of the statistical indicator. The indicator value list contains all indicator values of the statistical indicator.

For example, the statistical indicator is head state, the indicator value list according to head state includes 1, 2, and 3, and a first statistical array res1 corresponding to the statistical indicator of head state is created. The first statistics array res1 includes three elements, which are res1 [0], res1 [1], and res1 [2], respectively.

For another example, the statistical indicators are head state and gender, the indicator value list according to the head state includes 1, 2, 3, and the indicator value list according to the gender includes 1 and 2, and a first statistical array res2 corresponding to the statistical indicators including head state and gender is created. The first statistics array res2 includes five elements, which are res2 [0], res2 [1], res2 [2], res2 [3], and res2 [4], respectively.

In some embodiments of the present disclosure, the first statistical array includes a plurality of first elements, and the amount of the first elements is the same as the amount of indicator values in the indicator value list of the statistical indicator, so that the plurality of first elements are in one-to-one correspondence with the plurality of indicator values of the statistical indicator.

For example, in the case where the statistical indicator is head state, res1 [0] corresponds to indicator value 1, res1 [1] corresponds to indicator value 2, and res1 [2] corresponds to indicator value 3. The plurality of first elements res1 [0], res1 [1], and res1 [2] are used to perform statistics on indicator value 1, indicator value 2, and indicator value 3, respectively, that is, res1 [0] is used to perform statistics on the amount of people passing by the screen, res1 [1] is used to perform statistics on the amount of people reaching the screen, and res1 [2] is used to perform statistics on the amount of people following the screen.

For another example, in the case where the statistical indicators are head state and gender, res2 [0], res2 [1], and res2 [2] correspond to indicator value 1, indicator value 2, and indicator value 3 of the statistical indicator "head state", respectively, and res2 [3] and res2 [4] correspond to indicator value 1 and indicator value 2 of the statistical indicator "gender", respectively. The plurality of first elements res2 [0], res2 [1], res2 [2], res2 [3], and res2 [4] are used to perform statistics on indicator value 1 of head state, indicator value 2 of head state, indicator value 3 of head state, indicator value 1 of gender, and indicator value 2 of gender, respectively. That is, res2 [0] is used to perform statistics on the amount of people passing by the screen, res2 [1] is used to perform statistics on the amount of people reaching the screen, res2 [2] is used to perform statistics on the amount of people following the screen, res2 [3] is used to perform statistics on the amount of male, and res2 [4] is used to perform statistics on the amount of female.

For step S30, the plurality of first elements of the first statistical array are respective statistical sub-results of respective indicator values.

For example, in the case where the statistical indicator is head state, the indicator values for the statistical indicator of head state in Table 1 above are traversed, and the first elements res[0], res[1] and res[2] in the first statistical array res are used to perform statistics on the amount of indicator value 1, the amount of indicator value 2, and the amount of indicator value 3, respectively, so as to obtain the data statistical result. For example, the data statistical result is res[29, 42, 96], that is, the statistical sub-result of the indicator value 1 is 29, the statistical sub-result of the indicator value 2 is 42, and the statistical sub-result of the indicator value 3 is 96. In the case where the statistical indicators are the head state and gender, step S30 is similar to the case where the statistical indicator is the head state, and details are not repeated here.

For example, in the case where the data statistical result is obtained, the elements in the first statistical array are split, and an interval statistical result table is generated according to the elements in the first statistical array and the indicator values corresponding to the elements. Table 2 below schematically shows an interval statistical result table obtained by performing statistics on the sample data captured from 15:00 to 16:00 on Mar. 30, 2021.

TABLE 2

| Field | Statistical Time | Amount of people passing by the screen | Amount of people reaching the screen | Amount of people following the screen | Amount of male | Amount of female |
|---|---|---|---|---|---|---|
| Sample Data | Mar. 30, 2021 15:00:00-16:00:00 | 96 | 42 | 29 | 56 | 33 |

As illustrated in Table 2, the first statistical array res2 in the above embodiment is used to obtain the amount of people passing by the screen, the amount of people reaching the screen, the amount of people following the screen, the amount of male, and the amount of female during 15:00:00-16:00:00 on Mar. 30, 2021.

In some embodiments of the present disclosure, for example, a statistical function y=f(col, res_list) is defined, where col is the name of a specified field (that is, the name of a statistical indicator), res_list is a list of values for this field (that is, a list of indicator values of the statistical indicators), and the return value y is an array of the size of res_list. For example, running the statistical function can perform the above-mentioned steps S20 and S30 with reference to FIG. 1B. In the present embodiment, a person or a statistician skilled in the art only needs to input the name of the statistical indicator to be counted and a list of indicator values of the statistical indicator, and then a statistical function is called to perform statistics on the statistical indicator. Therefore, the data processing in the present embodiment can achieve high reusability.

In some embodiments of the present disclosure, the step S30 may be to traverse the indicator value of at least one piece of sample data in the statistical group, and use a plurality of elements in the first statistical array to count each indicator value in the statistical group, respectively, so as to obtain the data statistical result of each indicator value in the statistical group.

For example, in a scenario where the statistical indicator is head state, first, each first element in the first statistical array res is initialized to 0, and then, in response to acquiring the sample data, the indicator value of the head state of the piece of sample data is determined: if the indicator value of the head state of the sample data is 1, then res[0]±=1; if the indicator value of the head state of the sample data is 2, then res[1]+=1; and if the indicator value of the head state of the sample data is 3, then res[2]±=1, so as to obtain the data statistical result in the statistical group, that is, to obtain the statistical sub-results of each indicator value in the statistical group.

In some embodiments of the present disclosure, for example, the sample data is firstly grouped according to a certain sample indicator to obtain respective grouped data logical blocks. Then, within each grouped data logical block, other sample indicators serve as statistical indicators to preform statistics. For example, the sample data is firstly grouped according to the camera ID, and the grouped data logic block corresponding to each camera is obtained, and then, for each branch data logic block, the head state and/or gender serve as statistical indicators to perform statistics.

In some embodiments of the present disclosure, step S10 includes acquiring a plurality of pieces of sample data corresponding to each statistical group of a plurality of statistical groups; and step S30 includes, for each statistical group, traversing the indicator values of at least one piece of sample data, and performing statistics on the at least one piece of sample data by using the first statistical array, so as to obtain the data statistical result.

For example, step S10 is to acquire sample data captured in each preset time period of a plurality of preset time periods. For example, the preset time period is 1 hour, and the sample data of each hour is sequentially acquired taking 1 hour as the statistical unit. For example, if the current time is 16:32 on Mar. 30, 2021, the sample data captured from 15:00 to 16:00 on Mar. 30, 2021 is acquired, the sample data captured between 14:00 and 15:00 on Mar. 30, 2021 are acquired after 15:00 and before 16:00 on Mar. 30, 2021, and so on, and the sample data captured in each preset time period of the plurality of preset time periods is acquired. In the present embodiment, step S10 is to sequentially acquire hourly sample data.

In the present embodiment, for the step S30, for the hourly sample data, the indicator values of at least one piece of sample data are traversed, and the first statistical array is used to perform statistics on the at least one piece of sample data to obtain hourly data statistical result.

In some embodiments of the present disclosure, for example, for the sample data in each preset time period, statistics is performed at a certain moment after the preset time period and in the next preset time period adjacent to this preset time period. For example, for the sample data from 15:00 to 16:00 on Mar. 30, 2021, statistics is performed at a certain moment during 16:00 to 17:00 to obtain the data statistical result.

Figure 2:
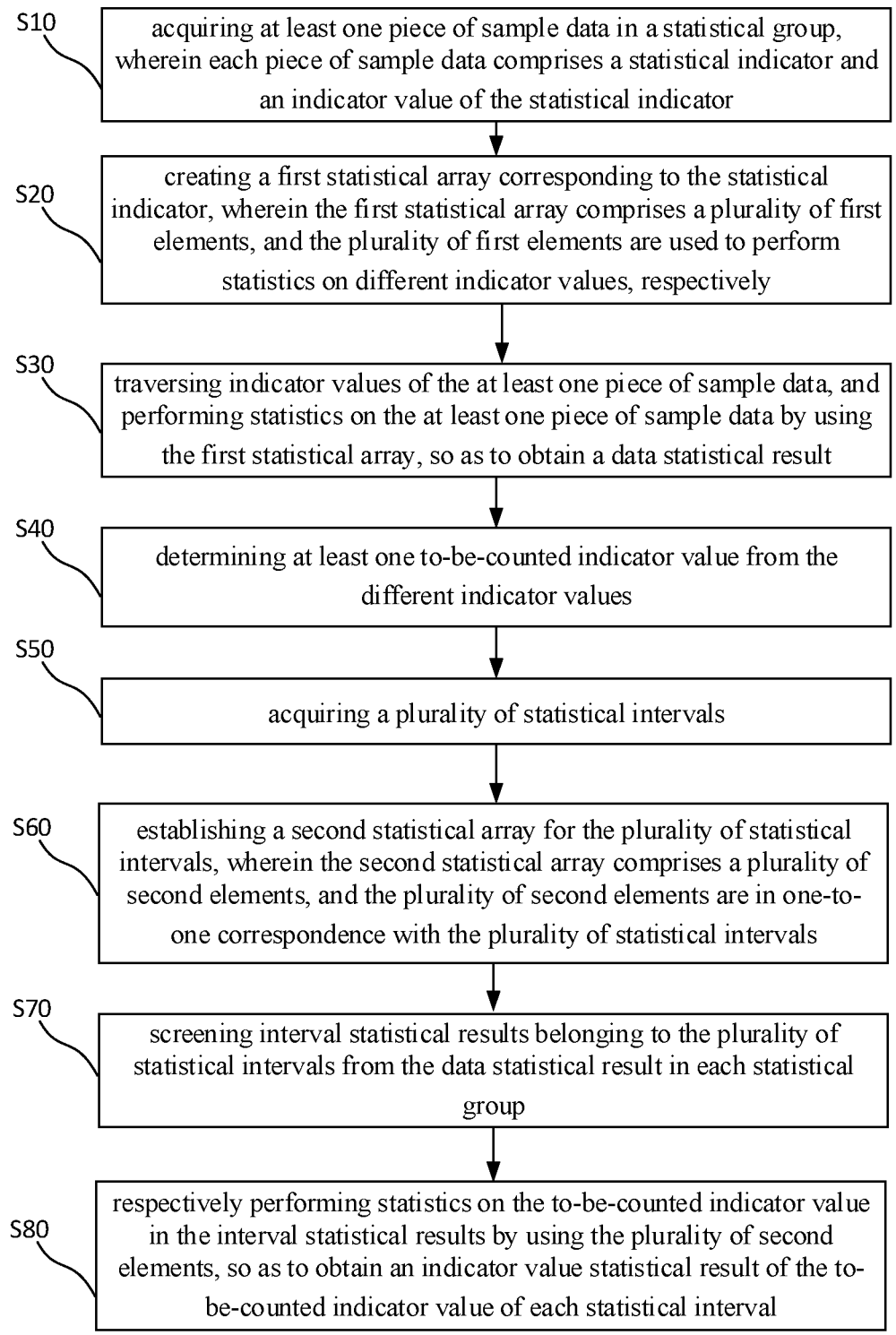
FIG. 2 illustrates a flowchart of another data processing method provided by at least one embodiment of the present disclosure.

FIG. 2 illustrates a flowchart of another data processing method provided by at least one embodiment of the present disclosure.

As illustrated in FIG. 2, based on including steps S10 to S30 in FIG. 1B, the data processing method further includes steps S40 to S80.

Step S40: determining at least one to-be-counted indicator value from different indicator values.

For example, one or more of the amount of people passing by the screen, the amount of people reaching the screen, the amount of people following the screen, the amount of male, and the amount of female in Table 2 are selected as the to-be-counted indicator values. For example, the to-be-counted indicator value is the amount of people passing by the screen.

Step S50: acquiring a plurality of statistical intervals.

In some embodiments of the present disclosure, at least one piece of sample data acquired in a statistical unit serves as a statistical group, and each statistical interval includes at least one statistical unit. For example, the statistical unit is a preset time period, or a preset amount of terminal devices.

In some embodiments of the present disclosure, the ranges of the plurality of statistical intervals are sequentially increased. For example, the plurality of statistical intervals include a first statistical interval and a second statistical interval, the range of the second statistical interval is larger than the range of the first statistical interval, and the first statistical interval is within the second statistical interval.

For another example, the plurality of statistical intervals include a first statistical interval, a second statistical interval, and a third statistical interval, the range of the third statistical interval is larger than the range of the second statistical interval, the second statistical interval is within the third statistical interval, the range of the second statistical interval is larger than the range of the first statistical interval, and the first statistical interval is within the second statistical interval.

For example, the statistical unit is a preset time period, and each statistical interval is at least one continuous preset time period. For example, if the current time is 2021-03-30, 16:32, the plurality of statistical intervals are current-day statistical interval [2021-03-30 00:00:00-2021-03-30 16:00:00), 7-day statistical interval [2021-03-23 16:00:00-2021-03-30 16:00:00), and 30-day statistical interval [2021-02-28 16:00:00-2021-03-30 16:00:00), respectively. That is, the plurality of statistical intervals respectively represent different time dimensions.

For another example, the statistical unit is one terminal device, and the plurality of statistical intervals are, for example, a certain terminal device, all terminal devices on a station including this terminal device, and all terminal devices on a line where the station is located, respectively.

Step S60: establishing a second statistical array for the plurality of statistical intervals, in which the second statistical array includes a plurality of second elements, and the plurality of second elements are in one-to-one correspondence with the plurality of statistical intervals.

For example, if the amount of the plurality of statistical intervals is N, and N is an integer greater than or equal to 2, the amount of the second elements in the second statistical array is also N, so that the plurality of second elements are in one-to-one correspondence with the plurality of statistical intervals.

For example, the amount of the plurality of statistical intervals is three, and the second statistical array ges includes three elements, which are ges[0], ges[1], and ges[2], respectively. For example, ges[0] corresponds to [2021-03-30 00:00:00-2021-03-30 16:00:00), ges[1] corresponds to [2021-03-23 16:00:00-2021-03-30 16:00:00), and ges[2] corresponds to [2021-02-28 16:00:00-2021-03-30 16:00:00).

For another example, if the amount of the to-be-counted indicator values is two, which are the amount of people passing by the screen and the amount of people reaching the screen, and the amount of the statistical intervals is three, the second statistical array ges includes six elements, which are ges[0], ges[1], ges[2], ges[3], ges[4], and ges[5], respectively. For example, ges[0], ges[1], and ges[2] are used to perform statistics on the amount of people passing by the screen in different time dimensions, and ges[3], ges[4], and ges[5] are used to perform statistics on the amount of people reaching the screen in different time dimensions.

Step S70: screening interval statistical results belonging to the plurality of statistical intervals from the data statistical result in each statistical group.

For example, the data statistical result within the largest statistical interval are screened from the data statistical results. For example, in the scenario where the plurality of statistical intervals are the current-day statistical interval, the 7-day statistical interval, and the 30-day statistical interval, respectively, the interval statistical result within the 30-day statistical interval [2021-02-28 16:00:00-2021-03-30 16:00:00) is screened from the data statistical results.

Step S80: respectively performing statistics on the to-be-counted indicator value in the interval statistical results by using the plurality of second elements, so as to obtain an indicator value statistical result of the to-be-counted indicator value of each statistical interval.

For example, the to-be-counted indicator value 1 (that is, the amount of people passing by the screen) within [2021-03-30 00:00:00-2021-03-30 16:00:00) is counted by using ges[0], the amount of people passing by the screen within [2021-03-23 16:00:00-2021-03-30 16:00:00) is counted by using ges[1], and the amount of people passing by the screen within [2021-02-28 16:00:00-2021-03-30 16:00:00) is counted by using ges[2], so that the amount of people passing by the screen within [2021-03-30 00:00:00-2021-03-30 16:00:00), the amount of people passing by the screen within [2021-03-23 16:00:00-2021-03-30 16:00:00), and the amount of people passing by the screen within [2021-02-28 16:00:00-2021-03-30 16:00:00) are acquired, respectively.

The method illustrated in FIG. 2 can realize data statistics of different dimensions through data processing once, realizes the calculation of high parallelism, thereby improving the efficiency of data calculation, and only the to-be-counted indicator value needs to be updated, so that the method can be applied to the statistics of the updated to-be-counted indicator value, so the method also has high reusability. This two-stage processing method (the first stage uses the method illustrated in FIG. 1B to obtain the data statistical result, and the second stage uses the method illustrated in FIG. 2 to obtain the indicator value statistical result) can reduce data redundancy, realize data regularization, and effectively avoid the performance problems of computing device caused by instantaneous large-throughput data.

In some embodiments of the present disclosure, the amount of second elements included in the second statistics array and the amount of first elements included in the first statistics array can be dynamically expanded according to actual requirements. For example, the statistical dimension of the second statistical array can be dynamically expanded through parameter configuration according to actual requirements.

Figure 3:
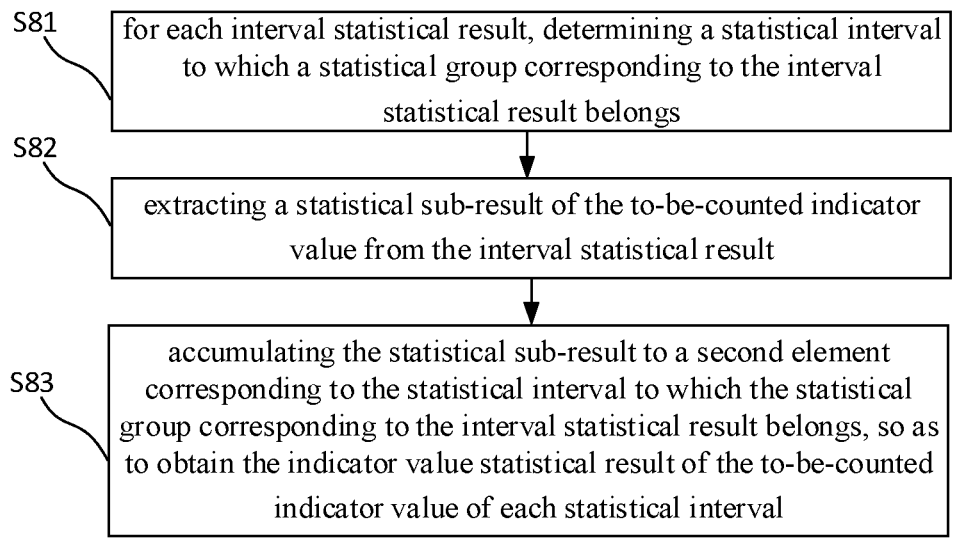
FIG. 3 illustrates a flowchart of a method of step S80 in FIG. 2 provided by at least one embodiment of the present disclosure.

FIG. 3 illustrates a flowchart of a method of the step S80 in FIG. 2 provided by at least one embodiment of the present disclosure.

As illustrated in FIG. 3, the data processing method includes steps S81 to S83.

Step S81: for each interval statistical result, determining the statistical interval to which the statistical group corresponding to the interval statistical result belongs.

For example, for the interval statistical result illustrated in Table 2, the preset time period of the statistics group corresponding to the interval statistical result is [2021-03-30 15:00:00-2021-03-30 16:00:00), and the statistical intervals to which the preset time period belongs not only include the current-day statistical interval [2021-03-30 00:00:00-2021-03-30 16:00:00), but also include the 7-day statistical interval [2021-03-23 16:00:00-2021-03-30 16:00:00) and the 30-day statistical interval [2021-02-28 16:00:00-2021-03-30 16:00:00).

Step S82: extracting the statistical sub-result of the to-be-counted indicator value from the interval statistical result.

For example, if the to-be-counted indicator value is the amount of people passing by, the statistical sub-result of the amount of people passing by is extracted from each interval statistical result. For example, the amount of people passing by within the current-day statistical interval [2021-03-30 15:00:00-2021-03-30 16:00:00) extracted from the interval statistical result illustrated in Table 2 is 29.

Step S83: accumulating the statistical sub-result to a second element corresponding to the statistical interval to which the statistical group corresponding to the interval statistical result belongs, so as to obtain the indicator value statistical result of the to-be-counted indicator value of each statistical interval.

For example, 29 is respectively accumulated to the current-day statistical interval [2021-03-30 00:00:00-2021-03-30 16:00:00), the 7-day statistical interval [2021-03-23 16:00:00-2021-03-30 16:00:00), and the 30-day statistical interval [2021-02-28 16:00:00-2021-03-30 16:00:00), so as to obtain the statistical results of the amount of people passing by within the current-day statistical interval [2021-03-30 00:00:00-2021-03-30 16:00:00), the 7-day statistical interval [2021-03-23 16:00:00-2021-03-30 16:00:00), and the 30-day statistical interval [2021-02-28 16:00:00-2021-03-30 16:00:00), respectively.

For example, according to three statistical intervals, the type of the second statistical array ges is an array format containing three second elements. In step S83, first, each element of ges is initialized to 0, and then the time of the interval statistical result is determined: in response to that the time of the interval statistical result is in [2021-03-30 00:00:00-2021-03-30 16:00:00), then res[0]+=num_pass, res[1]+=num_pass, and res[2]+=num_pass; in response to that the time of the interval statistical result is in [2021-03-23 16:00:00-2021-03-30 16:00:00), then res[1]+=num_pass, res[2]+=num_pass; and in response to that the time of the interval statistical result is in [2021-02-28 16:00:00-2021-03-30 16:00:00), then res[2]+=num_pass.

Figure 4:
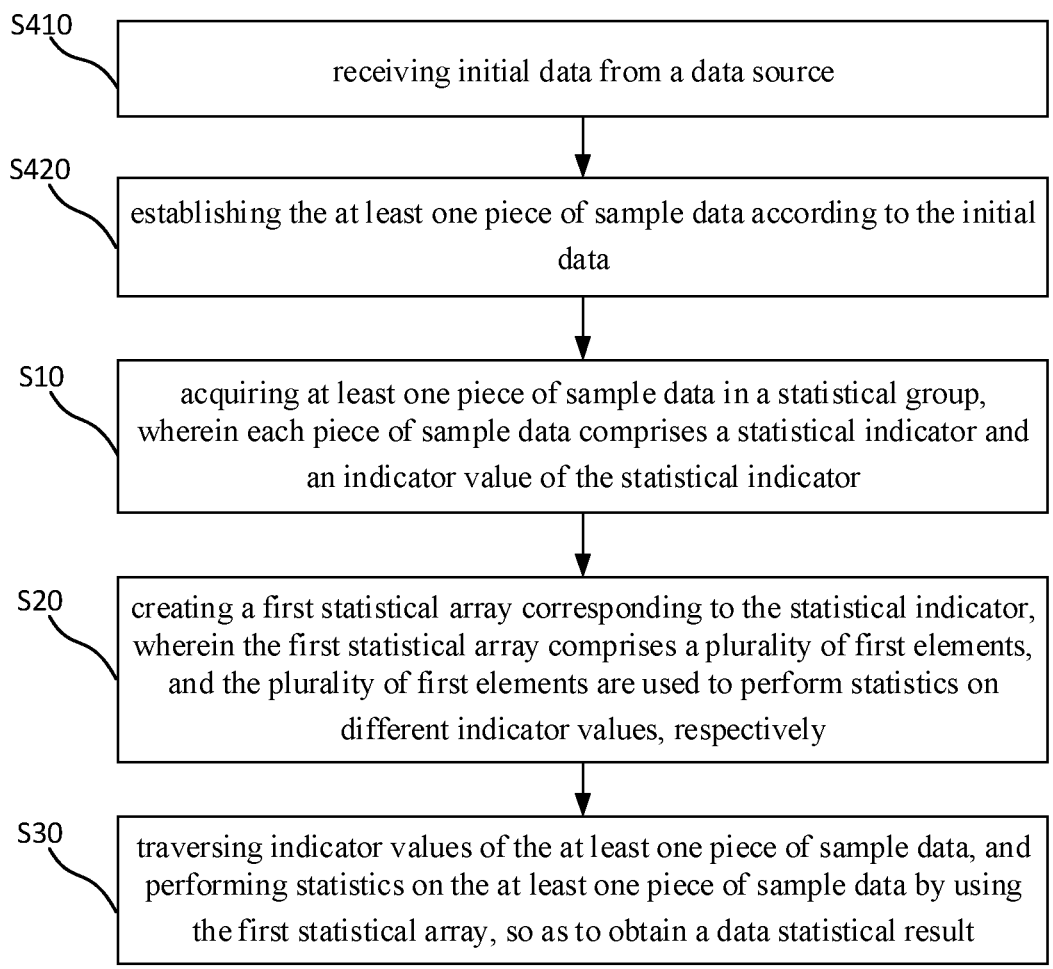
FIG. 4 illustrates a flowchart of another data processing method provided by at least one embodiment of the present disclosure.

FIG. 4 illustrates a flowchart of another data processing method provided by at least one embodiment of the present disclosure.

As illustrated in FIG. 4, based on including steps S10 to S30 in FIG. 1B, the data processing method further includes steps S410 to S420. For example, the step S410 and the step S420 are performed before the step S10.

Step S410: receiving initial data from a data source.

For example, in the system architecture illustrated in FIG. 1A, the big data background 103 receives initial data from the service end 102.

For example, in a subway scenario, the display screen includes a camera, and the camera transmits the captured initial data to the service end 102, and then the service end 102 transmits the initial data from the camera to the big data background 103 to push down the data processing to the big data background 103, which can reduce the pressure on the calculation and response time of the front-end visualization large screen and the service end.

Step S420: establishing at least one piece of sample data according to the initial data.

For example, the big data background 103 establishes at least one piece of sample data according to the initial data.

In some embodiments of the present disclosure, the initial data includes statistical attribute information. The statistical attribute information serves as information for storing the initial data. For example, if the initial data is stored according to time, the statistical attribute information is the event time in Table 1, or if the initial data is stored according to the camera ID, the statistical attribute information is the camera ID or the like.

For example, a storage file for storing the initial data is determined according to a preset time period to which the event time in the initial data belongs, and the initial data in each preset time period is stored in the same storage file. Alternatively, a storage file for storing the initial data is determined according to the camera ID in the initial data, and the initial data captured by each camera is stored in the same storage file.

Figure 5:
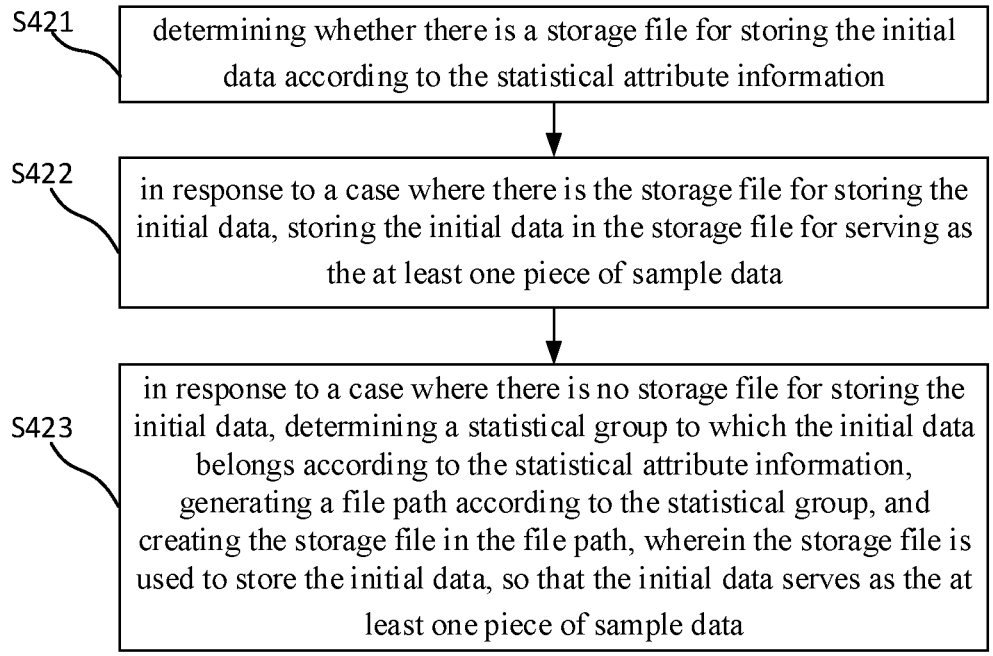
FIG. 5 illustrates a flowchart of a method of step S420 in FIG. 4 provided by at least one embodiment of the present disclosure.

FIG. 5 illustrates a flowchart of a method of a step S420 in FIG. 4 provided by at least one embodiment of the present disclosure.

As illustrated in FIG. 5, the method includes steps S421 to S423.

Step S421: determining whether there is a storage file for storing the initial data according to the statistical attribute information.

For example, the statistical attribute information is the event time, and it is determined whether there is a storage file for storing the initial data according to the event time of the initial data. For example, the initial data is stored in the storage file of the file path according to the path structure of " . . . /topic_name/load_date=YYYY-MM-dd/load_hour=HH". If there is a storage file in the file path corresponding to the event time, there is a storage file for storing the initial data. If there is no storage file in the file path corresponding to the event time, there is no storage file for storing the initial data.

In some embodiments of the present disclosure, the initial data belonging to the same statistical group is stored in the same storage file.

For example, the initial data belonging to the same preset time period is stored in the same storage file.

For example, the statistical attribute information of the initial data is Mar. 30, 2021 15:32, the preset time period to which Mar. 30, 2021 15:32 belongs is from Mar. 30, 2021 15:00 to Mar. 30, 2021 16:00, and the file path of the storage file storing the initial data is "topic_name/load_date=2021-03-30/load_hour=15". In step S421, it is determined whether there is a storage file in the file path "topic_name/load_date=2021-03-30/load_hour=15".

Step S422: in response to the case that there is the storage file for storing the initial data, storing the initial data in the storage file for serving as the at least one piece of sample data.

For example, if a storage file exists in the file path "topic_name/load_date=2021-03-30/load_hour=15", the initial data is stored in the storage file in the file path "topic_name/load_date=2021-03-30/load_hour=15", so that the initial data serves as the sample data.

Step S423: in response to the case that there is no storage file for storing the initial data, determining a statistical group to which the initial data belongs according to the statistical attribute information, generating a file path according to the statistical group, and creating the storage file in the file path, in which the storage file is used to store the initial data, so that the initial data serves as the at least one piece of sample data.

For example, if there is no storage file in the file path "topic_name/load_date=2021-03-30/load_hour=15", the preset time period of the statistical group to which the initial data belongs is determined to be from 2021-03-30, 15:00 to 2021-03-30, 16:00 according to the statistical attribute information 2021-03-30, 15:32. Then, the file path "topic_name/load_date=2021-03-30/load_hour=15" is generated according to the preset time period of the statistical group being from 2021-03-30, 15:00 to 2021-03-30, 16:00, and a storage file is created in the file path to store the initial data whose event time is in the preset time period from 2021-03-30, 15:00 to 2021-03-30, 16:00, so that the initial data serves as the sample data.

According to the above-mentioned embodiments, the initial data belonging to the same statistical group is stored in the same storage file, so that the initial data is divided when the initial data is stored, the initial data is conveniently searched subsequently, and the statistical efficiency is further improved.

In some embodiments of the present disclosure, for example, the initial data from the service end is stored in the big data background 103 (for example, stored in a local memory of the big data background 103, or stored in other storage devices associated with the big data background 103) according to the above-mentioned path structure by using a Kafka distributed log system, so that the big data background 103 can perform statistical analysis on the sample data. In the present embodiment, step S10 is to acquire at least one piece of sample data from a storage file that has been landed through the Kafka distributed log system.

In other embodiments of the present disclosure, the initial data may also be stored in a database. In this embodiment, step S10 is to acquire at least one piece of sample data from the database.

Figure 6:
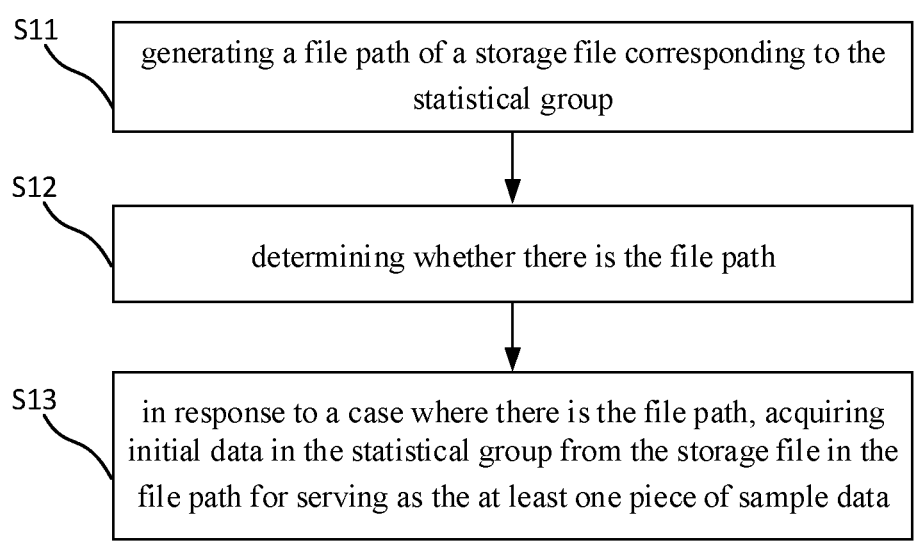
FIG. 6 illustrates a flowchart of a method of step S10 in FIG. 1 provided by at least one embodiment of the present disclosure.

FIG. 6 illustrates a flowchart of a method of the step S10 in FIG. 1 provided by at least one embodiment of the present disclosure.

As illustrated in FIG. 6, the method includes steps S11 to S13.

Step S11: generating a file path of a storage file corresponding to the statistical group.

For example, if the current time is 16:32 on Mar. 30, 2021, the sample data in the statistical group from 15:00 to 16:00 on Mar. 30, 2021 is acquired, and according to the storage rules described above in FIG. 5, the file path of the storage file that stores the sample data in the statistical group from 15:00 to 16:00 on Mar. 30, 2021 is "topic_name/load_date=2021-03-3 0/load_hour=15".

Step S12: determining whether there is a file path.

For example, whether there is the file path topic_name/load_date=2021-03-30/load_hour=15 is determined.

Step S13: in response to the case that there is the file path, acquiring the initial data in the statistical group from the storage file in the file path for serving as the at least one piece of sample data.

For example, in response to the case where there is the file path, the initial data in the statistical group is acquired from the storage file in the file path for serving as the at least one piece of sample data.

In some embodiments of the present disclosure, in response to the case where there is no file path, the acquisition of sample data of the next statistical group is continued or subsequent data processing steps are performed.

In some embodiments of the present disclosure, the data processing method is applied to a plurality of electronic devices. For example, the plurality of electronic devices form, for example, the big data background 103 illustrated in FIG. 1, that is, the plurality of electronic devices form a server cluster. The at least one piece of sample data includes a plurality of sample data sets, and the plurality of electronic devices are in one-to-one correspondence with the plurality of sample data sets. The plurality of electronic devices are configured to perform statistics based on the corresponding sample data sets, respectively, and accumulate statistical values to obtain the data statistical result. The plurality of sample data sets, for example, refer to sample data stored in different electronic devices, respectively.

For example, a part of sample data of the at least one piece of sample data in the statistical group from 15:00 to 16:00 on Mar. 30, 2021 are landed on a first server of the plurality of electronic devices, the part of sample data forms one sample data set, other sample data of the at least one piece of sample data in the statistical group from 15:00 to 16:00 on Mar. 30, 2021 except the above-mentioned part of sample data is landed on a second server of the plurality of electronic devices, and the other sample data forms another sample data set. The first server performs statistics on the part of sample data in the first server to obtain a first data statistical result res(a), and the second server performs statistics on the other sample data in the second server to obtain a second data statistical result res(b). Next, the data statistical result res of the statistical group from 15:00 to 16:00 on Mar. 30, 2021 is obtained by adding the corresponding first elements in res(a) and res(b). For example, res(a)[0]+res(b)[0]=res[0], res(a)[1]+res(b)[1]=res[1], and res(a)[2]+res(b)[2]=res[2].

Figure 7A:
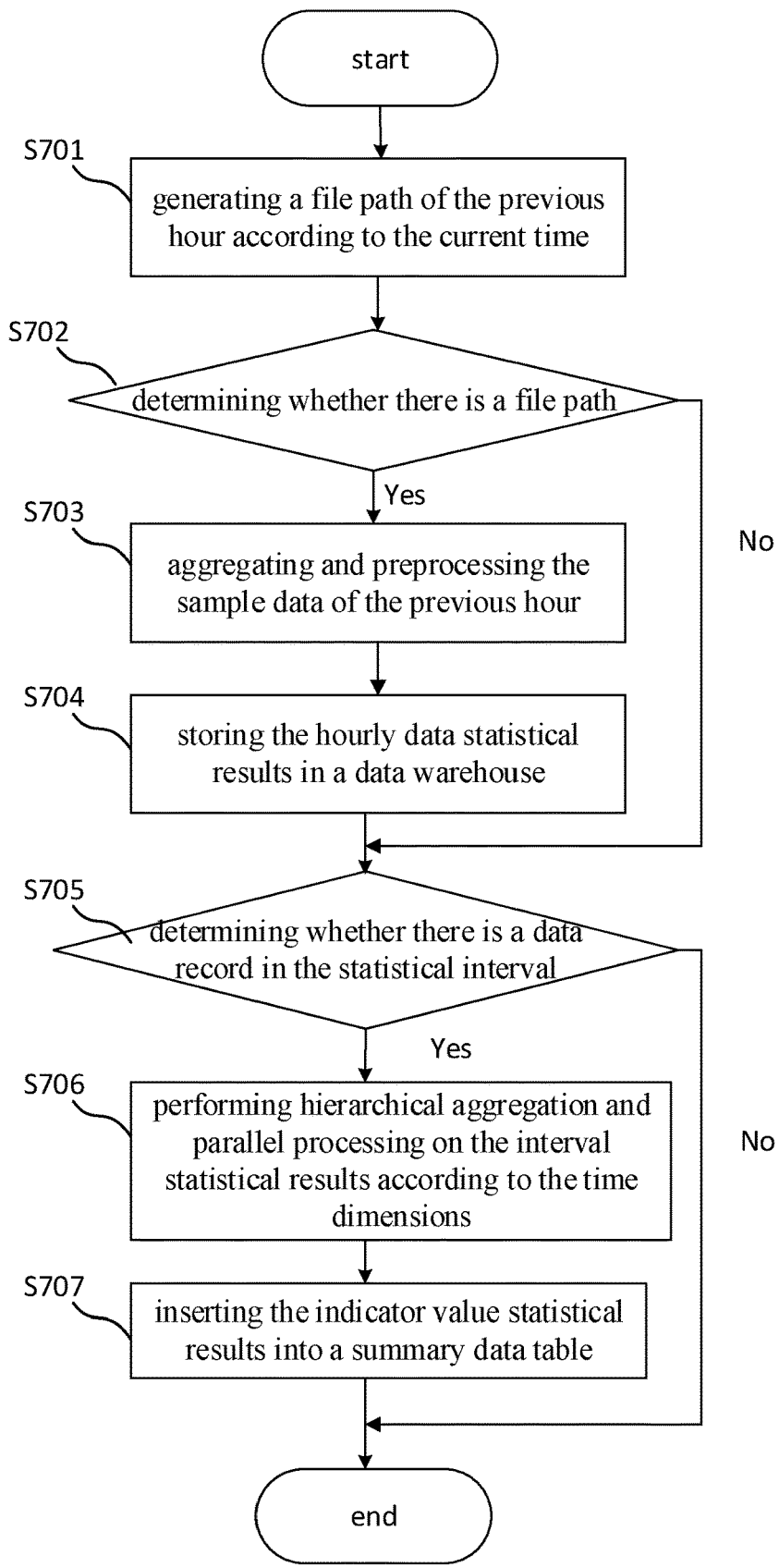
FIG. 7A illustrates a flowchart of another data processing method provided by at least one embodiment of the present disclosure.

FIG. 7A illustrates a flowchart of another data processing method provided by at least one embodiment of the present disclosure.

As illustrated in FIG. 7A, the data processing method includes steps S701 to S707. In the present embodiment, the data processing method is described by taking the case where the preset time period is 1 hour, that is, the statistical unit is 1 hour, as an example.

Step S701: generating a file path of the previous hour according to the current time.

For example, for the sample data in each preset time period, statistics is performed at a certain moment after the preset time period and in the next preset time period adjacent to the preset time period. For example, for the sample data from 15:00 to 16:00 on Mar. 30, 2021, statistics is performed at a certain moment between 16:00 to 17:00 to obtain the data statistical result. Therefore, for example, if the current time is 16:32 on Mar. 30, 2021, the file path of the previous hour is generated according to the current time, that is, the file path of the sample data from 15:00 to 16:00 on Mar. 30, 2021 is generated. According to the above-mentioned path structure, the file path generated is, for example, "topic_name/load_date=2021-03-30/load_hour=15".

The step S701 is similar to the step S11 in FIG. 6.

Step S702: determining whether there is a file path.

For example, whether there is the "topic_name/load_date=2021-03-30/load_hour=15" is determined.

If there is the file path "topic_name/load_date=2021-03-30/load_hour=15", step S703 is executed. If there is no file path "topic_name/load_date=2021-03-30/load_hour=15", step S705 is executed.

The step S701 is similar to the step S12 in FIG. 6.

Step S703: aggregating and preprocessing the sample data of the previous hour.

For example, the sample data in the file path "topic_name/load_date=2021-03-30/load_hour=15" is aggregated and preprocessed. The aggregating and preprocessing are, for example, performing steps S20 and S30 in FIG. 1B to acquire the data statistical result by performing statistics on the indicator values of the statistical indicators of the sample data.

Performing the above-mentioned steps S701 to S703 can obtain hourly data statistical results.

Step S704: storing the hourly data statistical results in a data warehouse. For example, the data statistical results are stored in the data warehouse in the form of the above-mentioned Table 2.

Step S705: determining whether there is a data record in the statistical interval.

For example, if there are a plurality of statistical intervals, and the ranges of the plurality of statistical intervals are sequentially increased, the step S705 is to determine whether there is a data record in a statistical interval with the largest range among the plurality of statistical intervals. For example, it is determined whether there is a data statistical result belonging to the statistical interval with the largest range in the data warehouse.

If there is data record in the statistical interval with the largest range, the interval statistical result belonging to the statistical interval with the largest range is screened from the data statistical result in each statistical group, and step S706 is executed.

If there is no data record in the statistical interval with the largest range, a prompt message of no data record is returned, and the data processing method ends.

Step S706: performing hierarchical aggregation and parallel processing on the interval statistical results according to the time dimensions.

For example, steps S81 to S83 described above with reference to FIG. 3 are executed to perform hierarchical aggregation and parallel processing on the interval statistical results according to the time dimensions, so as to obtain the indicator value statistical results of respective time dimensions. For example, the time dimensions include: the current-day statistical interval [2021-03-30 00:00:00-2021-03-30 16:00:00), the 7-day statistical interval [2021-03-23 16:00:00-2021-03-30 16:00:00), and the 30-day statistical interval [2021-02-28 16:00:00-2021-03-30 16:00:00).

Step S707: inserting the indicator value statistical results into a summary data table.

For example, the indicator value statistical results of the to-be-counted indicator values are inserted into a summary data table. For example, the summary data table includes respective indicator value statistical results for different to-be-counted indicator values. Summarizing the indicator value statistical results of the different to-be-counted indicator values into the summary data table can facilitate comparison and analysis by statisticians.

Figure 7B:
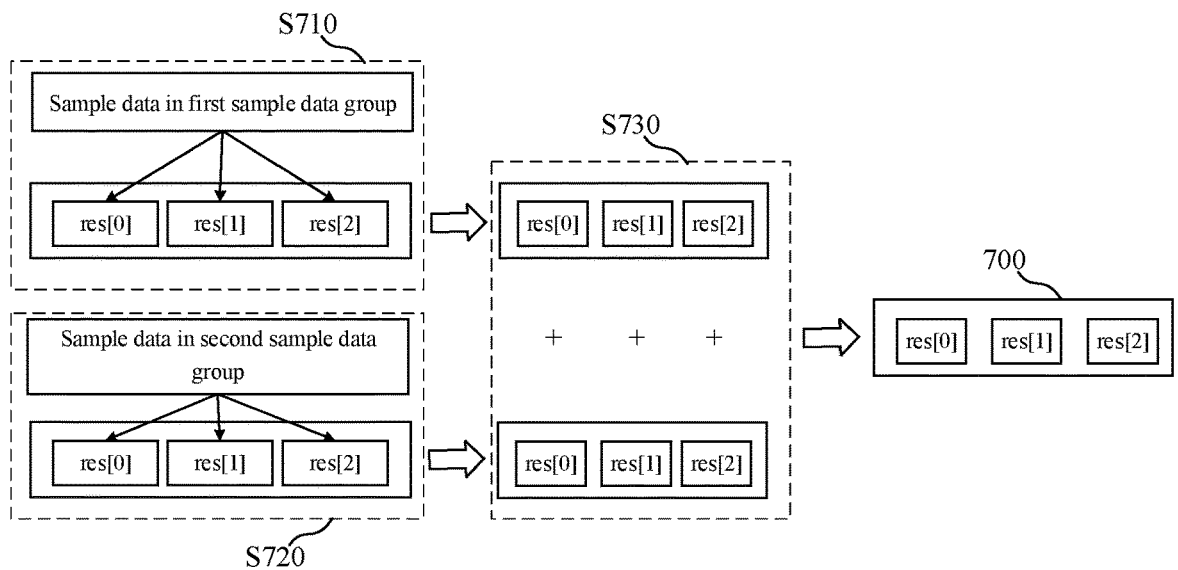
FIG. 7B illustrates a schematic diagram of another data processing method provided by at least one embodiment of the present disclosure.

FIG. 7B illustrates a schematic diagram of another data processing method provided by at least one embodiment of the present disclosure.

As illustrated in FIG. 7B, the data processing method includes steps S710 to S730. For example, step S710 is performed by the first server, and step S720 is performed by the second server.

Step S710: the first server performing data processing on sample data in a first sample data group in a statistical group according to the method illustrated in FIG. 1B. For example, the indicator values of the statistical indicator of the sample data in the first sample data group are counted by using the first statistical array res. For example, if the indicator value list of the statistical indicator contains three indicator values, then the first statistical array res contains three first elements, the three first elements are res[0], res[1], and res[2], respectively, and the three indicator values are counted by using the three first elements, respectively, so as to obtain the first data statistical result, that is, to obtain the statistical sub-results of respective indicator values in the first sample data group. For example, before using the first statistical array res to perform statistics on the indicator values of the statistical indicator of the sample data in the first sample data group, the first statistical array res is initialized, so that each first element is 0.

Step S720: the second server performing data processing on sample data in a second sample data group in a statistical group according to the method illustrated in FIG. 1B. For example, the indicator values of the statistical indicator of the sample data in the second sample data group are counted by using the first statistical array res to obtain the second data statistical result. For example, before using the first statistical array res to perform statistics on the indicator values of the statistical indicator of the sample data of the second sample data group, the first statistical array res is initialized, so that each first element is 0. It should be noted that the processing method of the second server is basically the same as the processing method of the first server, the difference is that the specific sample data for the second server and the specific sample data for the first server are different. For example, the second server processes the second sample data group, and the first server processes the first sample data group.

The statistical groups in step S710 and step S720 are the same statistical group, for example, both are the statistical group composed of sample data obtained from 15:00 to 16:00 on Mar. 30, 2021. The sample data of the same statistical group may be stored in different servers. Therefore, for the statistics of the sample data of the same statistical group, the statistical results of the sample data belonging to the same statistical group in different servers need to be calculated, so as to obtain the data statistical result of the same statistical group.

Step S730: adding the corresponding first element in the first data statistical result and the second data statistical result, so as to obtain the data statistical result 700. For example, the res[0] obtained by the first server through statistics and the res[0] obtained by the second server through statistics are added to obtain the res[0] of the data statistical result 700. Similarly, the res[1] obtained by the first server through statistics and the res[1] obtained by the second server through statistics are added to obtain the res[1] of the data statistical result 700, and the res[2] obtained by the first server through statistics and the res[2] obtained by the second server through statistics are added to obtain the res[2] of the data statistical result 700.

Figure 8:
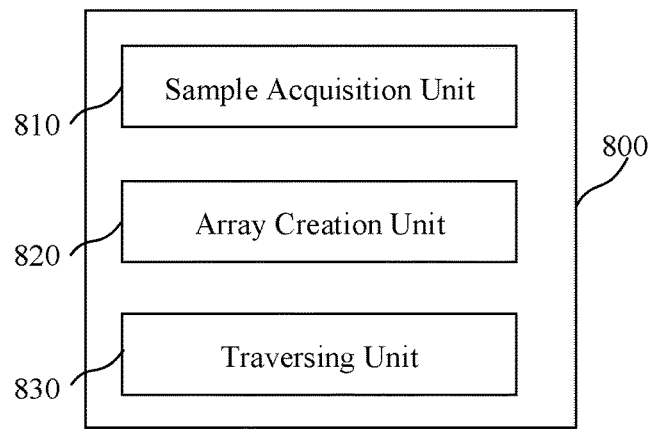
FIG. 8 illustrates a schematic block diagram of a data processing apparatus provided by at least one embodiment of the present disclosure.

FIG. 8 illustrates a schematic block diagram of a data processing apparatus provided by at least one embodiment of the present disclosure.

For example, as illustrated in FIG. 8, the data processing apparatus 800 includes a sample acquisition unit 810, an array creation unit 820, and a traversing unit 830.

The sample acquisition unit 810 is configured to acquire at least one piece of sample data in a statistical group, and each piece of sample data includes a statistical indicator and an indicator value of the statistical indicator.

The sample acquisition unit 810, for example, performs the step S10 described in FIG. 1B.

The array creation unit 820 is configured to create a first statistical array corresponding to the statistical indicator, the first statistical array includes a plurality of first elements, and the plurality of first elements are used to perform statistics on different indicator values, respectively.

The array creation unit 820, for example, performs the step S20 described in FIG. 1B.

The traversing unit 830 is configured to traverse indicator values of the at least one piece of sample data, and perform statistics on the at least one piece of sample data by using the first statistical array, so as to obtain a data statistical result. The plurality of first elements of the first statistical array are respective statistical sub-results of respective indicator values of the indicator values.

The traversing unit 830, for example, performs the step S30 described in FIG. 1B.

For example, the sample acquisition unit 810, the array creation unit 820, and the traversing unit 830 respectively are hardware, software, firmware, and any feasible combination thereof. For example, the sample acquisition unit 810, the array creation unit 820, and the traversing unit 830 respectively are a dedicated or general circuit, a chip or a device, etc., or are a combination of a processor and a memory. The embodiments of the present disclosure are not limited with respect to the specific implementation forms of the above-mentioned units.

It should be noted that, in the embodiments of the present disclosure, each unit of the data processing apparatus 800 corresponds to each step of the data processing method mentioned above. For the specific functions of the data processing apparatus 800, reference can be made to the relevant description of the data processing method, which will not be repeated here. The components and structures of the data processing apparatus 800 illustrated in FIG. 8 are only exemplary and not restrictive, and the data processing apparatus 800 may further include other components and structures as required.

At least one embodiment of the present disclosure further provides an electronic device, which includes a processor and a memory. The memory includes one or more computer program modules. The one or more computer program modules are stored in the memory and configured to be executed by the processor, and the one or more computer program modules include instructions for implementing the data processing method mentioned above. The electronic device can realize parallel statistics of the plurality of indicator values through data processing once by using an array, which improves statistical efficiency and has high reusability.

Figure 9:
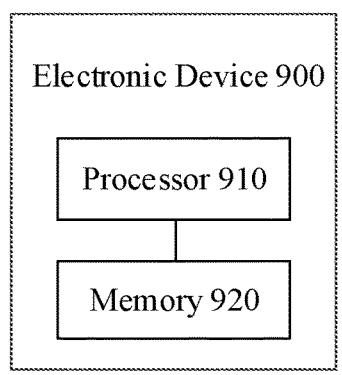
FIG. 9 illustrates a schematic block diagram of an electronic device provided by some embodiments of the present disclosure.

FIG. 9 illustrates a schematic block diagram of an electronic device provided by some embodiments of the present disclosure. As illustrated in FIG. 9, the electronic device 900 includes a processor 910 and a memory 920. The memory 920 is used to store non-transitory computer-readable instructions (e.g., one or more computer program modules). The processor 910 is configured to execute the non-transitory computer-readable instructions, and the processor 910 can perform one or more steps in the data processing method described above when the non-transitory computer-readable instructions are executed by the processor 910. The memory 920 and the processor 910 are interconnected by a bus system and/or other forms of connection mechanisms (not illustrated).

For example, the processor 910 is a central processing unit (CPU), graphics processing unit (GPU), or other forms of processing units having data processing capability and/or program execution capability. For example, the central processing unit (CPU) is of an X86 or ARM architecture, etc. The processor 910 is a general purpose processor or a special purpose processor and can control other components in the electronic device 900 to perform desired functions.

For example, the memory 920 includes one computer program product or any combination of multiple computer program products. The computer program products include various kinds of computer-readable storage media, e.g., volatile memory and/or nonvolatile memory. Volatile memory, for example, includes a random access memory (RAM) and/or a cache memory, and the like. Nonvolatile memory, for example, includes a read-only memory (ROM), a hard disk, an erasable programmable read-only memory (EPROM), a portable compact disk read-only memory (CD-ROM), a USB memory, a flash memory, and the like. The computer-readable storage medium can store one or more computer program modules, and the processor 910 can execute the one or more computer program modules to implement various functions of the electronic device 900. The computer-readable storage medium can further store various application programs and various data, various data used and/or generated by the application programs, and the like.

It should be noted that, in the embodiments of the present disclosure, for the specific functions and technical effects of the electronic device 900, reference can be made to the above description of the data processing method, and details are not repeated here.

Figure 10:
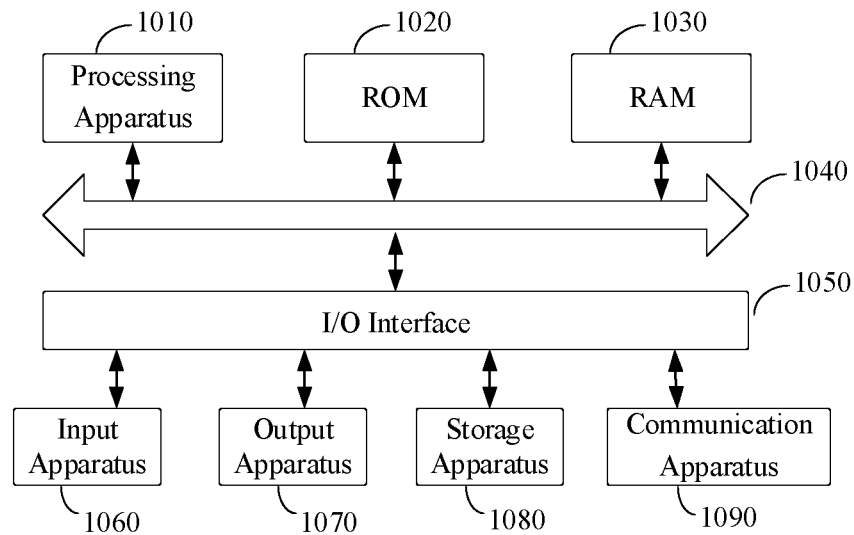
FIG. 10 illustrates a schematic block diagram of another electronic device provided by some embodiments of the present disclosure.

FIG. 10 illustrates a schematic block diagram of another electronic device provided by some embodiments of the present disclosure. The electronic device 1000 is, for example, suitable for implementing the data processing method provided by the embodiments of the present disclosure. The electronic device 1000 is a terminal device or the like. It should be noted that the electronic device 1000 illustrated in FIG. 10 is only an example, which does not impose any limitation on the function and scope of use of the embodiments of the present disclosure.

As illustrated in FIG. 10, the electronic device 1000 includes a processing apparatus (e.g., a central processing unit, a graphics processor, etc.) 1010 that can perform various appropriate actions and processes according to programs stored in a read-only memory (ROM) 1020 or loaded from a storage apparatus 1080 into a random access memory (RAM) 1030. The RAM 1030 further stores various programs and data necessary for the operation of the electronic device 1000. The processing apparatus 1010, the ROM 1020, and the RAM 1030 are connected to each other through a bus 1040, and an input/output (I/O) interface 1050 is also connected to the bus 1040.

Typically, the following apparatuses can be connected to the I/O interface 1050: an input apparatus 1060 including, for example, a touch screen, a touchpad, a keyboard, a mouse, a camera, a microphone, an accelerometer, a gyroscope, etc.; an output apparatus 1070 including, for example, a liquid crystal display (LCD), a speaker, a vibrator, etc.; a storage apparatus 1080 including, for example, a magnetic tape, a hard disk, etc.; and a communication apparatus 1090. The communication apparatus 1090 can allow the electronic device 1000 to communicate wirelessly or wired with other electronic devices to exchange data. Although FIG. 10 illustrates the electronic device 1000 having various apparatuses, it should be understood that not all of the illustrated apparatuses are required to be implemented or provided, and electronic device 1000 may alternatively be implemented or have more or fewer apparatuses.

For example, according to the embodiments of the present disclosure, the above-mentioned data processing method can be implemented as a computer software program. For example, the embodiments of the present disclosure further include a computer program product which includes a computer program carried on a non-transitory computer-readable medium, and the computer program includes program code for performing the above-mentioned data processing method. In such an embodiment, the computer program is downloaded and installed from the network through the communication apparatus 1090, from the storage apparatus 1080, or from the ROM 1020. When the computer program is executed by the processing apparatus 1010, the functions defined in the data processing methods provided by the embodiments of the present disclosure can be implemented.

At least one embodiment of the present disclosure further provides a computer-readable storage medium which stores non-transitory computer-readable instructions, and when the non-transitory computer-readable instructions are executed by a computer, the above-mentioned data processing method can be implemented. The computer-readable storage medium is used to realize parallel statistics of the plurality of indicator values through data processing once by using an array, which improves statistical efficiency and has high reusability.

Figure 11:
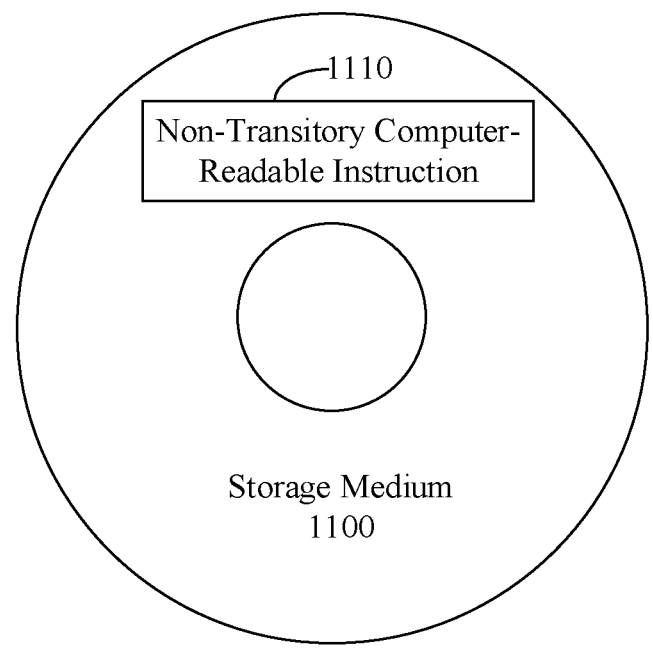
FIG. 11 illustrates a schematic diagram of a computer-readable storage medium provided by at least one embodiment of the present disclosure.

FIG. 11 illustrates a schematic diagram of a storage medium provided by at least one embodiment of the present disclosure. As illustrated in FIG. 11, the storage medium 1100 is used to store non-transitory computer-readable instructions 1110. For example, when the non-transitory computer-readable instructions 1110 are executed by a computer, one or more steps in the data processing method described above are performed.

For example, the storage medium 1100 is applied to the electronic device 900 described above. For example, the storage medium 1100 is the memory 920 in the electronic device 900 illustrated in FIG. 9. For example, for the relevant description of the storage medium 1100, reference can be made to the corresponding description of the memory 920 in the electronic device 900 illustrated in FIG. 9, and details are not repeated here.

The following statements should be noted.
(1) The accompanying drawings involve only the structure(s) in connection with the embodiment(s) of the present disclosure, and other structure(s) can be referred to common design(s).
(2) In case of no conflict, the embodiments of the present disclosure and the features in the embodiment(s) can be combined with each other to obtain new embodiment(s).

What have been described above are only specific implementations of the present disclosure, the protection scope of the present disclosure is not limited thereto, and the protection scope of the present disclosure should be based on the protection scope of the claims.

What is claimed is:

1. A data processing method, applied to a traffic all-media management and control platform for statistical analysis of data, wherein the traffic all-media management and control platform comprises a front-end visualization screen, a service end, and a big data background;

the method comprises:

acquiring at least one piece of sample data in a statistical group, wherein each piece of sample data comprises a statistical indicator and an indicator value of the statistical indicator;

creating a first statistical array corresponding to the statistical indicator, wherein the first statistical array comprises a plurality of first elements, and the plurality of first elements are used to perform statistics on different indicator values, respectively; and traversing indicator values of the at least one piece of sample data, and performing statistics on the at least one piece of sample data by using the first statistical array, so as to obtain a data statistical result, wherein the plurality of first elements of the first statistical array are statistical sub-results of respective indicator values, respectively;

the method further comprises:

receiving initial data from a data source; and establishing the at least one piece of sample data according to the initial data;

wherein the initial data comprises statistical attribute information, and establishing the at least one piece of sample data according to the initial data comprises:

determining whether there is a storage file for storing the initial data according to the statistical attribute information;

in response to a case where there is the storage file for storing the initial data, storing the initial data in the storage file for serving as the at least one piece of sample data; and in response to a case where there is no storage file for storing the initial data, determining a statistical group to which the initial data belongs according to the statistical attribute information, generating a file path according to the statistical group, and creating the storage file in the file path, wherein the storage file is used to store the initial data, so that the initial data serves as the at least one piece of sample data, and initial data belonging to a same statistical group is stored in a same storage file.

2. The method according to claim 1, wherein acquiring the at least one piece of sample data in the statistical group comprises:

acquiring a plurality of pieces of sample data corresponding to each statistical group of a plurality of statistical groups;

traversing the indicator values of the at least one piece of sample data, and performing statistics on the at least one piece of sample data by using the first statistical array, so as to obtain the data statistical result, comprises:

for each statistical group, traversing the indicator values of the at least one piece of sample data, and performing statistics on the at least one piece of sample data by using the first statistical array, so as to obtain the data statistical result.

3. The method according to claim 2, wherein at least one piece of sample data acquired in a statistical unit serves as one statistical group, and the method further comprises:

determining at least one to-be-counted indicator value from the different indicator values;

acquiring a plurality of statistical intervals, wherein each statistical interval comprises at least one statistical unit;

establishing a second statistical array for the plurality of statistical intervals, wherein the second statistical array comprises a plurality of second elements, and the plurality of second elements are in one-to-one correspondence with the plurality of statistical intervals;

screening interval statistical results belonging to the plurality of statistical intervals from the data statistical result in each statistical group; and respectively performing statistics on the to-be-counted indicator value in the interval statistical results by using the plurality of second elements, so as to obtain an indicator value statistical result of the to-be-counted indicator value of each statistical interval.

4. The method according to claim 3, wherein respectively performing statistics on the to-be-counted indicator value in the interval statistical results by using the plurality of second elements, so as to obtain the indicator value statistical result of the to-be-counted indicator value of each statistical interval, comprises:

for each interval statistical result, determining a statistical interval to which a statistical group corresponding to the interval statistical result belongs;

extracting a statistical sub-result of the to-be-counted indicator value from the interval statistical result; and accumulating the statistical sub-result to a second element corresponding to the statistical interval to which the statistical group corresponding to the interval statistical result belongs, so as to obtain the indicator value statistical result of the to-be-counted indicator value of each statistical interval.

5. The method according to claim 4, wherein traversing the indicator values of the at least one piece of sample data, and performing statistics on the at least one piece of sample data by using the first statistical array, so as to obtain the data statistical result, comprises:

traversing the indicator values of the at least one piece of sample data in the statistical group, and respectively counting respective indicator values in the statistical group by using a plurality of elements in the first statistical array, so as to obtain the data statistical result in the statistical group.

6. The method according to claim 4, wherein the plurality of statistical intervals comprise a first statistical interval and a second statistical interval; and a range of the second statistical interval is larger than a range of the first statistical interval, and the first statistical interval is within the second statistical interval.

7. The method according to claim 3, wherein the plurality of statistical intervals comprise a first statistical interval and a second statistical interval; and a range of the second statistical interval is larger than a range of the first statistical interval, and the first statistical interval is within the second statistical interval.

8. The method according to claim 3, wherein the statistical unit comprises a preset time period or at least one terminal device of a preset amount.

9. The method according to claim 3, wherein traversing the indicator values of the at least one piece of sample data, and performing statistics on the at least one piece of sample data by using the first statistical array, so as to obtain the data statistical result, comprises:

traversing the indicator values of the at least one piece of sample data in the statistical group, and respectively counting respective indicator values in the statistical group by using a plurality of elements in the first statistical array, so as to obtain the data statistical result in the statistical group.

10. The method according to claim 2, wherein traversing the indicator values of the at least one piece of sample data, and performing statistics on the at least one piece of sample data by using the first statistical array, so as to obtain the data statistical result, comprises:

traversing the indicator values of the at least one piece of sample data in the statistical group, and respectively counting respective indicator values in the statistical group by using a plurality of elements in the first statistical array, so as to obtain the data statistical result in the statistical group.

11. The method according to claim 1, wherein acquiring the at least one piece of sample data in the statistical group comprises:

generating a file path of a storage file corresponding to the statistical group;

determining whether there is the file path; and in response to a case where there is the file path, acquiring initial data in the statistical group from the storage file in the file path for serving as the at least one piece of sample data.

12. The method according to claim 1, wherein the data processing method is applied to a plurality of electronic devices, the at least one piece of sample data comprises a plurality of sample data sets, and the plurality of electronic devices are in one-to-one correspondence with the plurality of sample data sets; and the plurality of electronic devices are configured to perform statistics based on a corresponding sample data set, respectively, and perform summation on statistical values to obtain the data statistical result.

13. An electronic device, comprising:

a processor; and a memory, comprising one or more computer program instructions, wherein the one or more computer program instructions are stored in the memory and are capable of being executed by the processor to implement the data processing method according to claim 1.

14. A non-transitory computer-readable storage medium, storing computer-readable instructions, wherein the computer-readable instructions are capable of being executed by a processor to implement the data processing method according to claim 1.

15. A data processing apparatus, applied to a traffic all-media management and control platform for statistical analysis of data, wherein the traffic all-media management and control platform comprises a front-end visualization screen, a service end, and a big data background;

the data processing apparatus comprises:

a sample acquisition unit, configured to acquire at least one piece of sample data in a statistical group, wherein each piece of sample data comprises a statistical indicator and an indicator value of the statistical indicator;

an array creation unit, configured to create a first statistical array corresponding to the statistical indicator, wherein the first statistical array comprises a plurality of first elements, and the plurality of first elements are used to perform statistics on different indicator values, respectively; and a traversing unit, configured to traverse indicator values of the at least one piece of sample data, and perform statistics on the at least one piece of sample data by using the first statistical array, so as to obtain a data statistical result, wherein the plurality of first elements of the first statistical array are statistical sub-results of respective indicator values, respectively;

the data processing apparatus is further configured to:

receive initial data from a data source; and establish the at least one piece of sample data according to the initial data;

wherein the initial data comprises statistical attribute information, and establishing the at least one piece of sample data according to the initial data comprises:

determining whether there is a storage file for storing the initial data according to the statistical attribute information;

in response to a case where there is the storage file for storing the initial data, storing the initial data in the storage file for serving as the at least one piece of sample data; and in response to a case where there is no storage file for storing the initial data, determining a statistical group to which the initial data belongs according to the statistical attribute information, generating a file path according to the statistical group, and creating the storage file in the file path, wherein the storage file is used to store the initial data, so that the initial data serves as the at least one piece of sample data, and initial data belonging to a same statistical group is stored in a same storage file.

* * * * *